United States Patent
Du et al.

(10) Patent No.: US 11,743,286 B2
(45) Date of Patent: Aug. 29, 2023

(54) COMBINATION RULE MINING FOR MALWARE SIGNATURE GENERATION

(71) Applicant: Palo Alto Networks, Inc., Santa Clara, CA (US)

(72) Inventors: Min Du, San Jose, CA (US); Wenjun Hu, Santa Clara, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 134 days.

(21) Appl. No.: 17/364,102

(22) Filed: Jun. 30, 2021

(65) Prior Publication Data

US 2022/0247758 A1  Aug. 4, 2022

Related U.S. Application Data

(60) Provisional application No. 63/143,533, filed on Jan. 29, 2021.

(51) Int. Cl.
*H04L 9/40* (2022.01)

(52) U.S. Cl.
CPC ........ *H04L 63/145* (2013.01); *H04L 63/1416* (2013.01); *H04L 63/1425* (2013.01); *H04L 63/20* (2013.01)

(58) Field of Classification Search
CPC .............................. H04L 63/14; H04L 63/145
See application file for complete search history.

(56) References Cited

U.S. PATENT DOCUMENTS

| | | | | |
|---|---|---|---|---|
| 9,762,593 | B1 * | 9/2017 | Kennedy | H04L 63/164 |
| 9,805,312 | B1 * | 10/2017 | Shaked | G06F 16/22 |
| 10,581,888 | B1 * | 3/2020 | Agranonik | H04L 63/1466 |
| 2011/0271341 | A1 * | 11/2011 | Satish | G06F 21/566 726/23 |
| 2013/0246371 | A1 * | 9/2013 | Ahuja | H04L 63/0227 707/684 |
| 2015/0096021 | A1 * | 4/2015 | Uscilowski | G06F 16/951 726/23 |
| 2017/0091451 | A1 * | 3/2017 | Kovác | G06F 21/562 |
| 2017/0154182 | A1 * | 6/2017 | Ferrara | G06F 11/3604 |
| 2018/0124082 | A1 * | 5/2018 | Siadati | G06N 5/047 |
| 2018/0212998 | A1 * | 7/2018 | Ahuja | G06F 9/45558 |
| 2019/0199736 | A1 * | 6/2019 | Howard | H04L 63/1425 |
| 2019/0213489 | A1 * | 7/2019 | Hewlett, II | G06N 5/04 |
| 2019/0342308 | A1 * | 11/2019 | Chai | H04L 63/1425 |

(Continued)

OTHER PUBLICATIONS

Adebayo et al., Improved Malware Detection Model with Apriori Association Rule and Particle Swarm Optimization, Security and Communication Networks, 2019, vol. 2019.

(Continued)

*Primary Examiner* — Khang Do
(74) *Attorney, Agent, or Firm* — Van Pelt, Yi & James LLP

(57) ABSTRACT

Malware signature generation through combination rule mining is disclosed. A set of properties associated, collectively, with a plurality of data samples is received. A first data sample has a first set of properties and a second data sample has a second set of properties. A combination signature comprising at least a first property included in the first set of properties and a second property included in the second set of properties is generated.

23 Claims, 7 Drawing Sheets

(56) References Cited

U.S. PATENT DOCUMENTS

2019/0364062 A1* 11/2019 Xu .................. H04L 63/145
2022/0070219 A1* 3/2022 Bryzgin ............ H04L 63/1491
2022/0417255 A1* 12/2022 Kwon ................ H04L 63/145

OTHER PUBLICATIONS

Afek et al., Automated Signature Extraction for High Volume Attacks, 2013.

Agarwal et al., A Tree Projection Algorithm for Generation of Frequent Itemsets, Journal of Parallel and Distributed Computing, 2001.

Agrawal et al., Fast Algorithms for Mining Association Rules, Proc. 20th Int. Conf. Very Large Data Bases, 1994, pp. 487-499, vol. 1215.

Alhanahnah et al., Efficient Signature Generation for Classifying Cross-Architecture IoT Malware, 2018 IEEE Conference on Communications and Network Security (CNS), 2018, pp. 1-9.

Aslan et al., A Comprehensive Review on Malware Detection Approaches, IEEE Access, 2020, pp. 6249-6271, vol. 8.

Atzeni et al., Countering Android Malware: A Scalable Semi-Supervised Approach for Family-Signature Generation, IEEE Access 6, 2018, vol. 6, pp. 59540-59556.

Bayer et al., Scalable, Behavior-Based Malware Clustering, 2009.

Brumley et al., Towards Automatic Generation of Vulnerability-Based Signatures, 2006 IEEE Symposium on Security and Privacy (S&P'06), 2006.

Chee et al., Algorithms for Frequent Itemset Mining: A Literature Review, Artificial Intelligence Review 52, 2019, pp. 2603-2621.

Chen et al., XGBoost: A Scalable Tree Boosting System, KDD '16, Aug. 13-17, 2016, 785-794, San Francisco, CA, USA.

David et al., DeepSign: Deep Learning for Automatic Malware Signature Generation and Classification, International Joint Conference on Neural Networks (IJCNN), Jul. 2015, pp. 1-8.

Ding et al., A Fast Malware Detection Algorithm Based on Objective-Oriented Association Mining, Computers & Security 39, 2013, pp. 315-324.

Dolan-Gavitt et al., Robust Signatures for Kernel Data Structures, CCS'09, Nov. 2009.

Doll et al., Automated Pattern Inference Based on Repeatedly Observed Malware Artifacts, Proceedings of the 14th International Conference on Availability, Reliability and Security, 2019, pp. 1-10.

El-Hajj et al., COFI-tree Mining: A New Approach to Pattern Growth with Reduced Candidacy Generation, Workshop on Frequent Itemset Mining Implementations (FIMI'03) in conjunction with IEEE-ICDM, 2003.

Griffin et al., Automatic Generation of String Signatures for Malware Detection, International Workshop on Recent Advances in Intrusion Detection, 2009, pp. 101-120.

Han et al., Mining Frequent Patterns without Candidate Generation, ACM Sigmod Record, 2000.

Hoseini et al., A New Algorithm for Mining Frequent Patterns in CAN tree, 2nd International Conference on Knowledge-Based Engineering and Innovation (KBEI), 2015.

Karin Ask, Automatic Malware Signature Generation, Oct. 16, 2006.

Kaur et al., Hybrid Intrusion Detection and Signature Generation Using Deep Recurrent Neural Networks, Neural Computing and Applications (2020), 2020, pp. 7859-7877.

Kephart et al., Automatic Extraction of Computer Virus Signatures, Proceedings of the 4th Virus Bulletin International Conference, 1994, pp. 179-194, Abingdon, England.

Kim et al., Autograph: Toward Automated Distributed Worm Signature Detection, USENIX Security Symposium, 2004.

Kodinariya et al., Review on Determining No. of Cluster in K-Means Clustering, International Journal of Advance Research in Computer Science and Management Studies, Nov. 2013, vol. 1, No. 6, pp. 90-95.

Kolbitsch et al., Effective and Efficient Malware Detection at the End Host, 18th USENIX Security Symposium, 2009, pp. 351-398.

Lee et al., LARGen: Automatic Signature Generation for Malwares Using Latent Dirichlet Allocation, IEEE Transactions on Dependable and Secure Computing, 2018, vol. 15, No. 5, pp. 771-783.

Lee et al., Learning Patterns from Unix Process Execution Traces for Intrusion Detection, AAAI Technical Report WS-97-07, 1997.

Li et al., AGIS: Towards Automatic Generation of Infection Signatures, 2008 IEEE International Conference on Dependable Systems and Networks With FTCS and DCC (DSN), 2008, pp. 237-246.

Liang et al., Fast and Automated Generation of Attack Signatures: A Basis for Building Self-Protecting Servers, CCS'05, 2005.

Liu et al., Integrating Classification and Association Rule Mining, KDD-98 Proceedings, 1998.

Luca Cetro, Automatic Malware Signature Generation, Master Thesis, Oct. 2018.

Luca Mannella, Heuristics and Evolutionary Algorithms for Android Malware Signature Optimization, Apr. 2018.

Mohammed J. Zaki, Scalable Algorithms for Association Mining, IEEE Transactions on Knowledge and Data Engineering, 2000.

Naderi et al., Malware Signature Generation Using Locality Sensitive Hashing, CGIS, 2019, pp. 115-124, vol. 939.

Nahmias et al., Deep Feature Transfer Learning for Trusted and Automated Malware Signature Generation in Private Cloud Environments, Neural Networks 124 (2020), 2020, pp. 243-257.

Naidu et al., Exploring the Effects of Gap-Penalties in Sequence-Alignment Approach to Polymorphic Virus Detection, Journal of Information Security, 2017, pp. 293-327.

Naidu et al., Generating Rule-Based Signatures for Detecting Polymorphic Variants Using Data Mining and Sequence Alignment Approaches, Journal of Information Security, 2018, pp. 265-298.

Newsome et al., Polygraph: Automatically Generating Signatures for Polymorphic Worms, 2005 IEEE Symposium on Security and Privacy (S&P'05), 2005.

Olawale Surajudeen Adebayo, Android-Based Malware Classification Using Apriori Algorithm with Particle Swarm Optimization, Jan. 2017.

Park et al., Towards Automated Application Signature Generation for Traffic Identification, 2008 IEEE, 2008, pp. 160-167.

Perdisci et al., Behavioral Clustering of HTTP-Based Malware and Signature Generation Using Malicious Network Traces, NSDI, 2010, vol. 10. 14.

Pyun et al., Efficient Frequent Pattern Mining Based on Linear Prefix tree, Knowledge-Based Systems 55 (2014), 2014, pp. 125-139.

Shabtai et al., F-Sign: Automatic, Function-Based Signature Generation for Malware, IEEE Transactions on Systems, Man, and Cybernetics—Part C: Applications and Reviews, Jul. 2011, vol. 41, No. 4, pp. 494-508.

Song et al., A Transaction Mapping Algorithm for Frequent Itemsets Mining, IEEE Transactions on Knowledge and Data Engineering, 2006.

Starov et al., Detecting Malicious Campaigns in Obfuscated JavaScript with Scalable Behavioral Analysis, 2019 IEEE Security and Privacy Workshops (SPW), 2019, pp. 218-223.

Tahan et al., Auto-Sign: An Automatic Signature Generator for High-Speed Malware Filtering Devices, Journal in Computer Virology 6, 2010, pp. 91-103.

Venkataraman et al., Limits of Learning-based Signature Generation with Adversaries, 2008.

Wressnegger et al., Automatically Inferring Malware Signatures for Anti-Virus Assisted Attacks, ASIA CCS '17, Apr. 2017, pp. 587-598.

Xin Hu, Large-Scale Malware Analysis, Detection, and Signature Generation, 2011.

Yang et al., Automatically Generating Malware Summary Using Semantics Behavior Graphs (SBGs), 2020 Information Communication Technologies Conference, 2020, pp. 282-291.

Ye et al., An Intelligent PE-Malware Detection System Based on Association Mining, Journal in Computer Virology, Nov. 2008.

Ye et al., CIMDS: Adapting Postprocessing Techniques of Associative Classification for Malware Detection, IEEE Transactions on

(56) References Cited

OTHER PUBLICATIONS

Systems, Man, and Cybernetics—Part C: Applications and Reviews, May 2010, pp. 298-307, vol. 40, No. 3.
Ye, Yangfang, et al. "IMDS: Intelligent malware detection system." Proceedings of the 13th ACM SIGKDD international conference on Knowledge discovery and data mining. ACM, 2007.
Yutaka Sasaki, The Truth of the F-Measure, Oct. 26, 2007.
Zand et al., Extracting Probable Command and Control Signatures for Detecting Botnets, SAC'14, 2014.
Zhu et al., Measuring and Modeling the Label Dynamics of Online Anti-Malware Engines, Proceedings of the 29th USENIX Security Symposium, Aug. 2020, pp. 2361-2378.

\* cited by examiner

COMBINATION RULE MINING FOR MALWARE SIGNATURE GENERATION

CROSS REFERENCE TO OTHER APPLICATIONS

This application claims priority to U.S. Provisional Patent Application No. 63/143,533 entitled AUTOCOMBO: COMBINATION RULE MINING FOR MALWARE SIGNATURE GENERATION filed Jan. 29, 2021, which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

DETAILED DESCRIPTION

Figure 1:
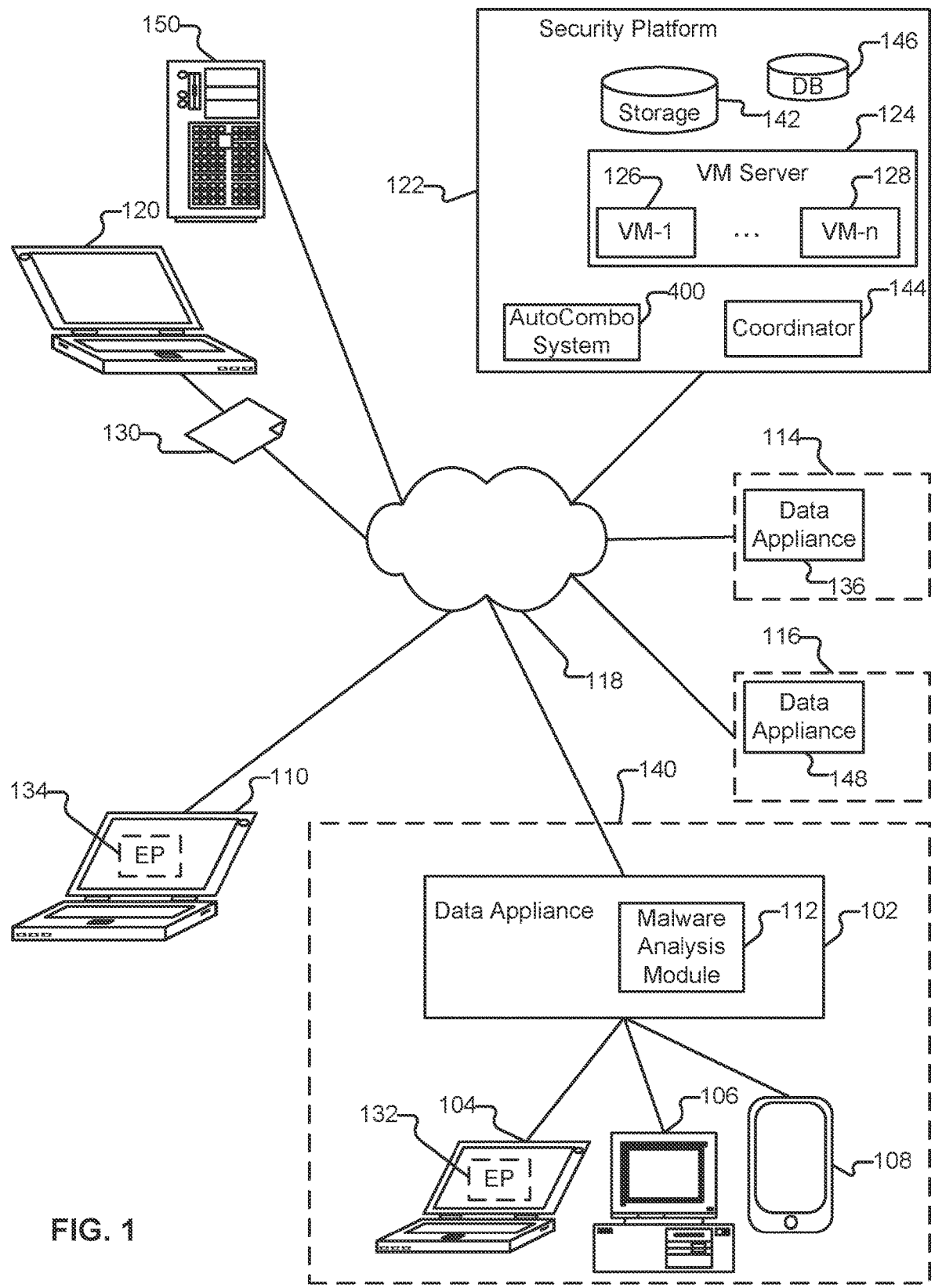
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. OVERVIEW

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. EXAMPLE ENVIRONMENT

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
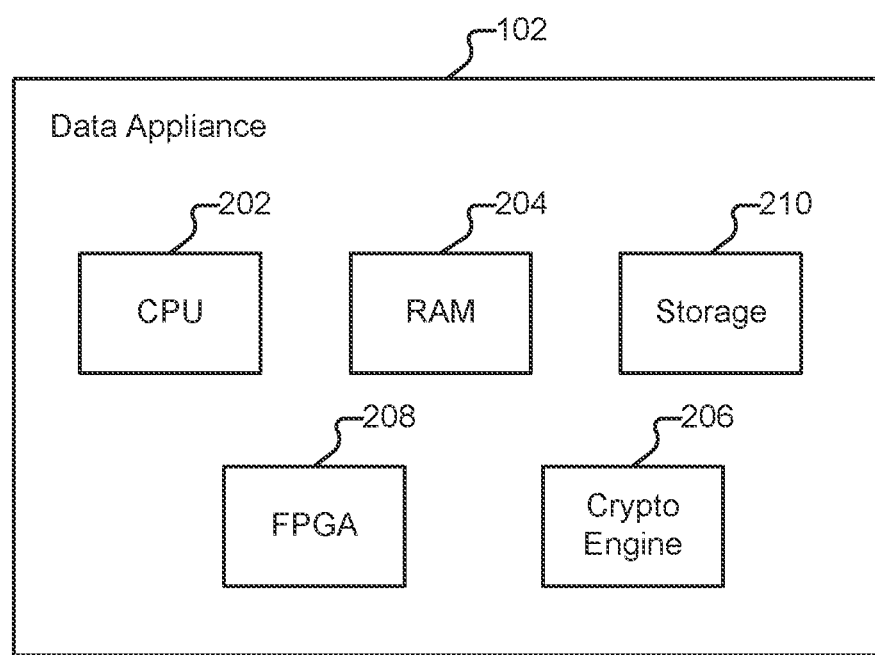
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
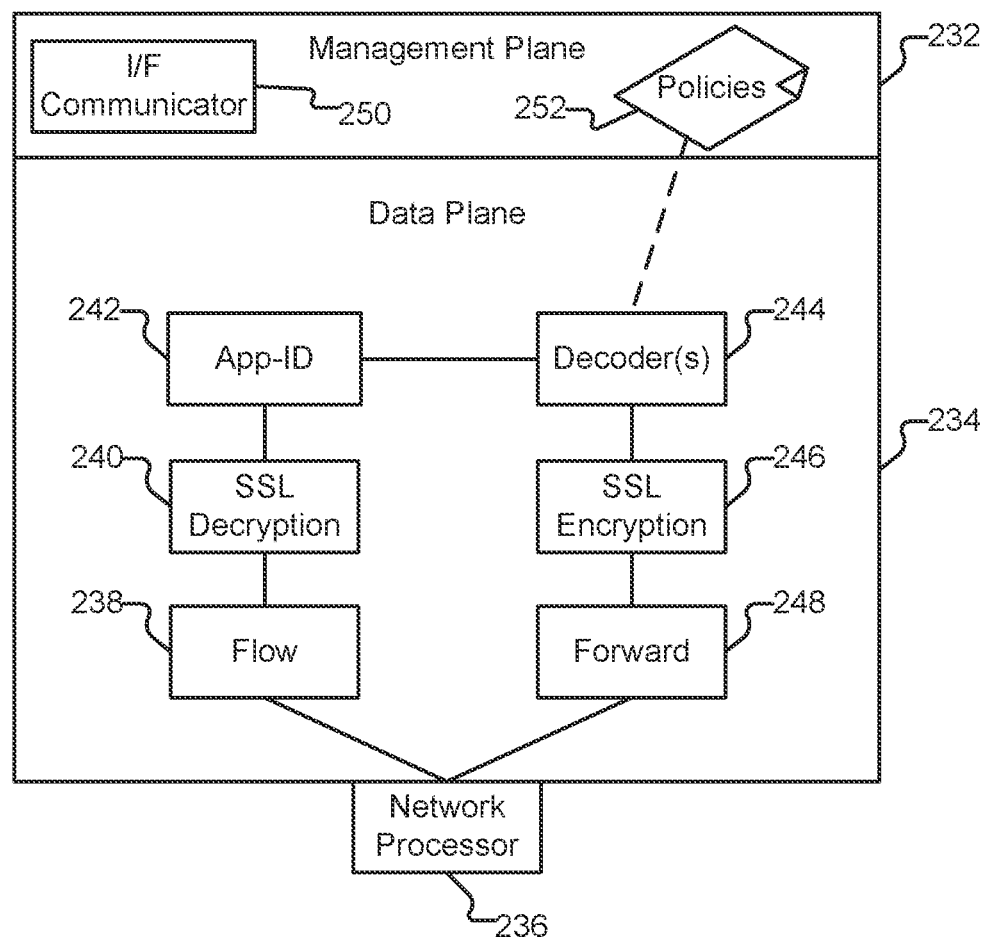
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244.

Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. SECURITY PLATFORM

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s))

running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. ANALYZING SAMPLES USING STATIC/DYNAMIC ANALYSIS

Figure 3:
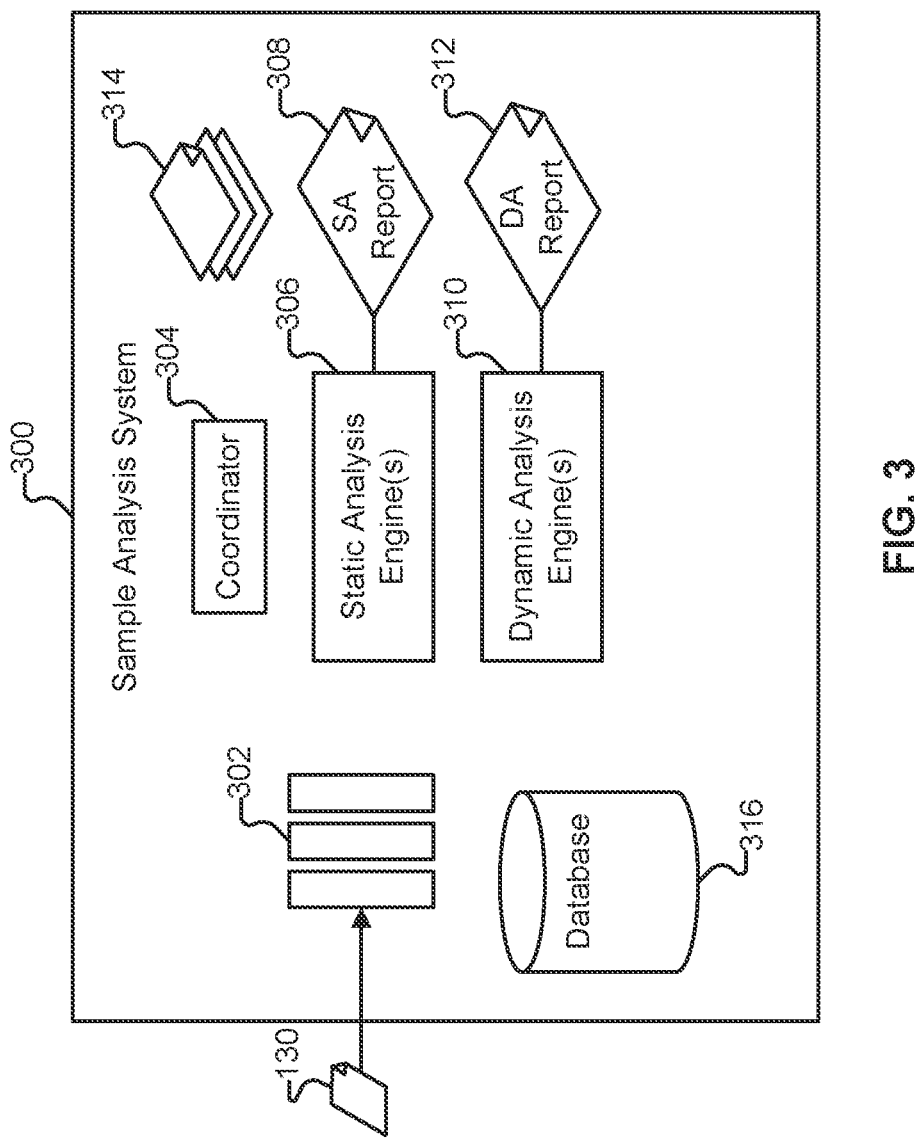
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. COMBINATION RULE MINING FOR MALWARE SIGNATURE GENERATION

A. Introduction

In various embodiments, one task performed by security platform 122 is malware signature generation. A malware signature is a unique identifier that is (ideally) constructed to only match malicious data, without matching any benign data. Such signatures can have a variety of formats, generally classified into three categories. The first type is a substring (i.e., a contiguous sequence of bytes/characters such as a piece of binary code). The second type is a subsequence (i.e., an ordered sequence of tokens that appear in the same order in the malware being detected). A generalized form of a subsequence is a regular expression. The third type is a combination rule. A combination rule signature can be viewed as a fixed set of one or more properties, each of which describes some characteristic of an analyzed sample. Such properties can be structural features extracted by observing the static software file (during static analysis), and can also be behavioral features determined by executing it (during dynamic analysis). Examples of properties include "corrupted PE header" (for a Windows Portable Executable file), "delayed a particular process during runtime," "attempted to contact a particular outside address while executing," and "sent a malformed HTTP request." The number of all distinct properties for a given file type is finite and can be represented using a unique property identifier.

A combination rule signature can be represented by a set of unordered and distinct properties, where each property can indicate any pre-defined characteristic. If a sample is detected by a combination signature rule as malicious, that means the sample expresses all properties contained by the signature. An example combination rule signature is: {"Created an executable file in the Windows system folder", "Moved itself"}. A sample can be detected as malicious if it exhibits both of these behaviors while being analyzed.

Unfortunately, existing techniques for extracting meaningful features from samples are often ad hoc and time-consuming. To address these and other problems, in various embodiments, security platform 122 includes an automated combination rule generation system 400 that can efficiently and automatically generate combination rule signatures. Techniques described herein are both greedy and complete, generating higher quality signatures first, but capable of traversing all possible property combinations for a complete generation. Various optimization strategies (e.g., using multi-processing and additional data structure storage) are also described.

B. Notation

Let $P=\{p_1, p_2, \ldots, p_n\}$ be the universe of properties. For each software sample file, the security analysis procedure (e.g., performed by security platform 122) checks if it has each of the properties in P. Suppose $M=\{m_1, m_2, \ldots, m_x\}$ is a list of malicious samples. The set of properties identified from $m_i$ can be denoted as $P(m_i)$. Similarly, $P(b_i) \subseteq \mathcal{P}$ denotes the property set identified from each benign sample $b_i$ in $\mathcal{B}=\{b_1, b_2, \ldots, b_y\}$.

A malware signature S refers to a combination of properties in $\mathcal{P}$, such that $S \subseteq P(m_i)$ holds true for many $i \in [1, x]$, and $S \subseteq P(b_i)$ for few $i \in [1, y]$. A signature S is said to hit or match a sample if the property combination is a subset of the properties identified in the sample (i.e., S hits or matches sample if $S \subseteq P(m_i)$).

An overview of the process of combination rule malware signature generation is to mine the universe of properties $\mathcal{P}$ to find combinations that satisfy the criteria of being a signature. First, a signature should match many malware samples and few benign ones. Second, the total number of signatures cannot be arbitrarily large, due to detection speed or hardware requirements. As used herein, "TP" (true positive) is used to represent the number of malware samples matched by a property combination and "FP" (false positive) is used to denote the number of matched benign samples. TPR (=TP/x) and FPR (=FP/y) are short for the malware detection ratio and false positive ratio.

With a general goal of improving malware detection, the generated signatures together should have as many malware hits as possible, and as few benign hits as possible. In particular, using $\mathcal{M}(S_i)$ ($\mathcal{B}(S_i)$) to denote the subset of malicious (benign) samples that are matched by signature $S_i$, the generated signatures should have high $TP=\cup_{i=1}^{MS} \mathcal{M}(S_i)$ and low $FP=\cup_{i=1}^{MS} \mathcal{B}(S_i)$.

The following are example constraints used (e.g., by security platform 122) in implementing embodiments of techniques described herein.

MinTP: each signature S should hit at least a minimum number of malicious samples $m_i$, i.e., $TP(S) \geq MinTP$.

MaxFP: each signature S should hit at most a maximum number of benign samples $b_i$, i.e., $FP(S) \leq MaxFP$.

MaxSize (MS): the total number of malware signatures S should not exceed a certain value, MaxSize.

Note that the above constraints are not meant to cover all possible requirements for malware detection. For example, an alternative for MaxSize can be that the amount of FPR caused by all signatures together should not exceed a particular threshold. Further, a single threshold (e.g., the minimum ratio TP/FP of a signature) can be used to replace MinTP and MaxFP together. Further, while signatures are described herein in conjunction with a given sample positively having particular properties, in some embodiments, signatures also/instead convey that a sample does not have particular properties (e.g., a sample does not make use of a particular protocol).

C. Example Architecture

1. Overview

Figure 4:
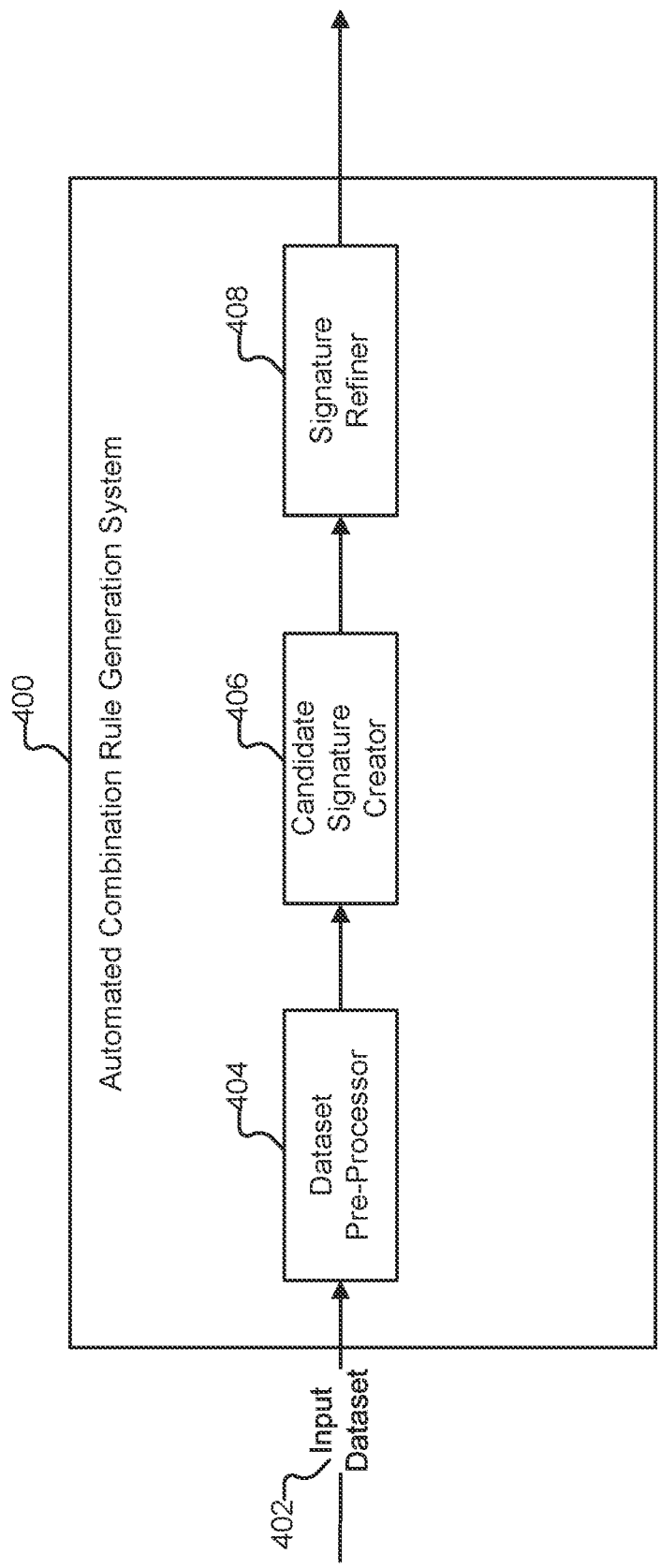
FIG. 4 illustrates an example of an embodiment of an automated combination rule generation system.

FIG. 4 illustrates an example of an embodiment of an automated combination rule generation system. As mentioned above, in various embodiments, security platform 122 includes automated combination rule generation system 400. Components of automated combination rule generation system 400 can be implemented in a variety of ways, including as a set of one or more scripts (e.g., written in Java, python, etc., as applicable). After analysis (e.g., by an applicable static analysis engine 306 and dynamic analysis engine 310), a given sample (whether benign or malicious) has associated with it (e.g., stored in database 316) a set of properties (e.g., as obtained from the applicable static analysis report 308 and dynamic analysis report 312). Automated combination rule generation system 400 takes, as an input dataset 402, entries comprising those sets of properties (identified from a given sample) and a ground truth label indicating whether the sample is benign or malicious. As mentioned above, security platform 122 can process a variety of different types of samples obtained from a variety of sources. Dataset pre-processor 404 parses input data 402 with the goal of best accelerating subsequent processing. Following that, the process of signature generation is performed by two components: a candidate signature creator 406 which creates all possible signatures within the constraints of the specified MinTP and MaxFP, and a signature refiner 408 which selects up to MaxSize signatures, with the goal of maximizing overall detection performance.

Figure 5:
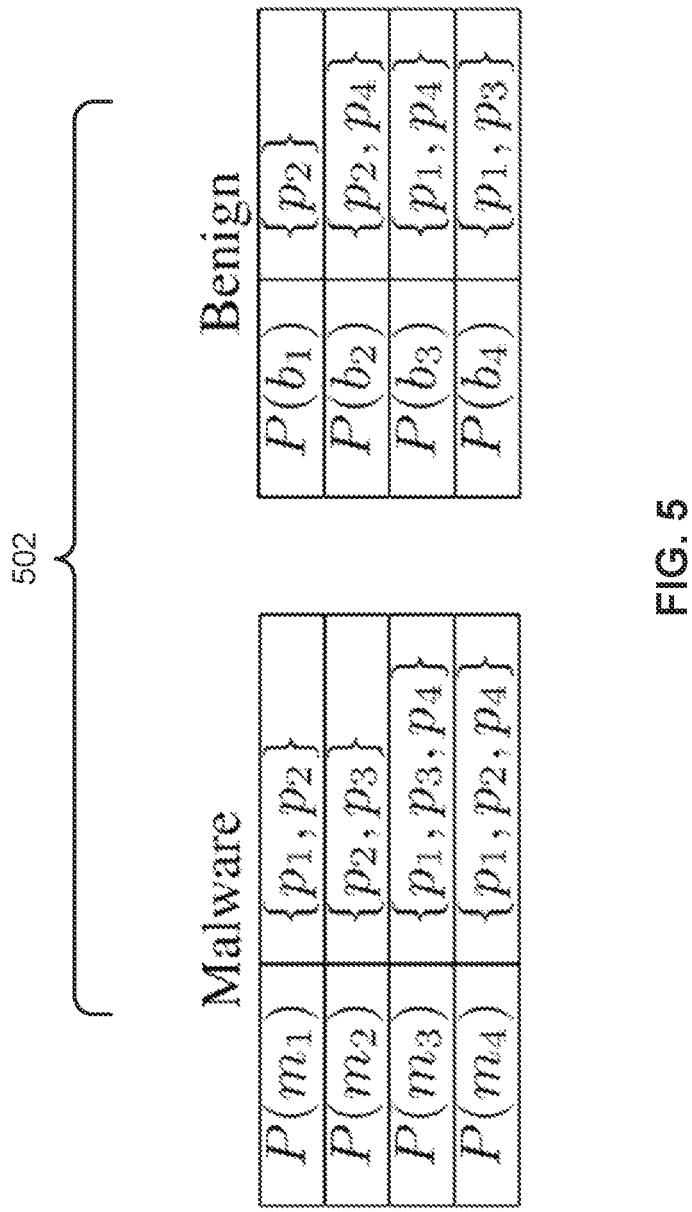
FIG. 5 illustrates an example of an input dataset.

An example of input dataset 402 is shown as dataset 502 in FIG. 5. Dataset 502 includes four malware samples and four benign samples, each with a corresponding set of properties. In the following discussion of various aspects of automated combination rule generation system 400, suppose the specified constraints are: MinTP=2, MaxFP=1, and MaxSize=2. As will be described in more detail below, in this example scenario, automated combination rule generation system 400 will generate two signatures: $S_1=\{p_1, p_2\}$ and $S_2=\{p_3\}$, which together detect all four malware samples and cause one FP: $b_4$.

2. Dataset Pre-Processing

One aspect of generating combination rules is to check whether the property combination, e.g., $P_i$, is a subset of the sample properties, e.g., $P(m_j)$. This unit function can be denoted as $\text{issubset}(P_i, P(m_j))$. One approach to this operation is to first hash $P(m_j)$, and then check if each property in $P_i$ also exists in $P(m_j)$. This approach has linear time complexity. However, this operation needs to be done for each combination and each sample, which is potentially a very large search space.

In various embodiments, automated combination rule generation system 400 includes a dataset pre-processor 404 that takes raw data (e.g., dataset 502) as input, and outputs a data format that optimizes the efficiency of subsequent processing. One example of such pre-processing that can be performed is for pre-processor 404 to convert each sample into an integer. Dataset pre-processor 404 first collects all $|\mathcal{P}|$=n distinct properties from the input dataset, and then maps each property to a distinct index of 0 to n−1. For example, a mapping for dataset 502 could be $\{p_1: 0, p_2: 1, p_3: 2, p_4: 3\}$. With this mapping, each sample property list in the input dataset can be converted to an integer, where each bit position indicates whether the property having that index exists in the sample or not. The resulting integerized property set for a sample can be denoted I(sample). After this pre-processing is performed, the binary representation for each converted integer in dataset 502 is:

$I(m_1)=11_2, I(m_2)=110_2, I(m_3)=1101_2, I(m_4)=1011_2$;
$I(b_1)=10_2, I(b_2)=1010_2, I(b_3)=1001_2, I(b_4)=101_2$.

In subsequent processing, these integers are loaded and checked against each combination. The process of checking if a candidate $P_i$ is a subset of $P(m_j)$ can be done by verifying if $I(P_i)$ & $I(P(m_j))==I(P_i)$, which is a constant time operation. Note that performing such integerization is optional, as it may not always be faster than the hash set approach (or other possible optimizations), depending, for example, on $|\mathcal{P}|$, the average number of properties for each sample, and the implementation platforms.

3. Candidate Signature Creation

Candidate signature creator 406 is configured to generate (e.g., from the output of dataset pre-processor 404) all possible signatures that satisfy the condition of MinTP and MaxFP. One approach is to enumerate all possible combinations of properties in $\mathcal{P}$ and check each combination against all input samples by performing the unit function ISSUBSET. The time complexity of enumerating all possible combinations is $O(2^n)$. Using dataset 502 as an example, all possible combinations of property set $\{p_1, p_2, p_3\}$ are $\{\{p_1\}, \{p_2\}, \{p_3\}, \{p_1, p_2\}, \{p_1, p_3\}, \{p_2, p_3\}, \{p_1, p_2, p_3\}\}$. Adding any new property into the property set would double the size. In a real production environment, there could be easily hundreds of distinct properties. Given x+y input samples, the time complexity for a naive implementation $O(2^n \cdot (x+y))$. To reduce the time complexity, in some embodiments, automated combination rule generation system 400 prunes combinations that do not have the potential to become signatures. Moreover, automated combination rule generation system 400 generates higher quality signatures first, allowing for early stopping. As used herein, ISSIGNATURE($P_i$) refers to a function that returns true if combination $P_i$ is a signature. It checks total malware and benign hits for $P_i$ and returns true if both: 1) ISSUBSET($P_i, m_j$) is true for at least MinTP malware samples, and 2) ISSUBSET($P_i, b_j$) is true for at most MaxFP benign samples. The time complexity for this function is $O(x+y)$.

a. Property Sorting

In various embodiments, while enumerating all possible property combinations and performing the ISSIGNATURE function, automated combination rule generation system 400 prioritizes checking the combinations that are more likely to become signatures first. One way to achieve this is for candidate signature creator 406 to sort all properties in $\mathcal{P}$ using a score that indicates their ability to separate malware from benign samples. The score (MF-IBF, short for malware frequency—inverse benign frequency) can be computed by the number of malware samples having property $p_i$, divided by the number of such benign samples. For dataset 502, the MF-IBF scores for $p_1, p_2, p_3, p_4$ are 3/2, 3/2, 2/1, 2/2 respectively. The corresponding sorted property list is: $[p_3, p_1, p_2, p_4]$.

b. Candidate Enumeration

In various embodiments, candidate signature creator 406 uses a best-first enumeration schedule with prompt pruning to generate all possible signatures that satisfy MinTP and MaxFP.

i. Best-First Enumeration

In various embodiments, candidate signature creator 406 divides the whole enumeration process into iterations. For each iteration, it picks one property from the sorted property list, and enumerates all new combinations. Using the list $[p_3, p_1, p_2, p_4]$ as an example:

Iteration 1: add new property $p_3$, enumerate $\{p_3\}$.
Iteration 2: add new property $p_1$, enumerate $\{p_1\}$, $\{p_1, p_3\}$.
Iteration 3: add new property $p_2$, enumerate $\{p_2\}$, $\{p_2, p_1\}$, $\{p_2, p_3\}$, $\{p_2, p_1, p_3\}$.
Iteration 4: add new property $p_4$, enumerate $\{p_4\}$, $\{p_4, p_3\}$, . . . , $\{p_4, p_3, p_1\}$, . . . , $\{p_4, p_3, p_1, p_2\}$.

This iteration schedule encourages those combinations having higher potential to become useful signatures to be enumerated first, which gives automated combination rule generation system 400 an option to stop processing input dataset 402 early.

ii. Prompt Pruning

Using the constraints provided above, a signature needs to satisfy MinTP and MaxFP at the same time. If a combination does not hit enough malware samples, none of its supersets will exceed MinTP and can be pruned. Moreover, if a combination is verified to be a signature, its supersets can be pruned as well since they will not add any unique malware coverage. Only the combinations that hit more than MinTP malicious samples and more than MaxFP benign samples need to be expanded to check their supersets. In various embodiments, the second pruning rule is loosened (e.g., if other approaches are used to generate signatures having as low an FP as possible).

In various embodiments, candidate signature creator 406 keeps a pruned set of combinations, and prevents any of their supersets to be checked. This can save a significant amount of useless searching. Using an example where MinTP=2 and MaxFP=1, the enumeration schedule dataset 502 is simplified as below.

Iteration 1: check $\{p_3\}$ via ISSIGNATURE($\{p_3\}$); $\{p_3\}$ hits two malware samples and one benign sample→signature.
Iteration 2: check $\{p_1\}$: TP=3 and FP=2→expand; prune $\{p_1, p_3\}$ because it is a superset of $\{p_3\}$.
Iteration 3: check $\{p_2\}$: TP=3 and FP=2→expand; further check $\{p_2, p_1\}$: TP=2 and FP=0→signature; prune all other combinations for being supersets of $\{p_3\}$.

Iteration 4: check {$p_4$}: TP=2 and FP=2→expand; check {$p_4$, $p_1$}: TP=2 and FP=1→signature; {$p_4$, $p_2$}: TP=1<MinTP→prune. Others are pruned for being supersets.

In the end, seven out of fifteen combinations are checked, with combinations that have better potential enumerated first.

4. Signature Refining

Signature refiner 408 is configured to select up to MS signatures, from all those generated by candidate signature creator 406, aiming to maximize overall detection performance. To simplify the presentation and without loss of generality, SCORE=TP/FP is used herein as a measure of detection quality. Either a higher TP or a lower FP would make the SCORE higher, indicating better detection performance.

Suppose that candidate signature creator 406 produces three signature candidates:
1) {$p_3$}: TP={$m_2$, $m_3$}, FP={$b_4$};
2) {$p_2$, $p_1$}: TP={$m_1$,$m_4$}, FP={ };
3) {$p_4$, $p_1$}: TP={$m_3$, $m_4$}, FP={$b_3$}.

And, as also previously discussed, suppose only MS=2 signatures are allowed to publish. Suppose FINAL-LIST contains all these signatures. Using $C$ to denote all signature candidates (|$C$|3 using dataset 502), the task is thus to select up to MS signatures from $C$ to FINAL-LIST. A goal is for the selected signatures together give best SCORE among all other combinations in $C$. Two example ways to select created signatures into FINAL-LIST are provided below, with a trade-off between time complexity and detection quality.

a. Best-Remaining Approach

For each round of signature selection, one approach would be to go through $C$, check the SCORE of FINAL-LIST if adding each signature, and select the one that gives FINAL-LIST the best SCORE, repeating for MS rounds. For the example of dataset 502, this approach first adds signature {$p_2$, $p_1$} into FINAL-LIST. Then, it checks the remaining two signatures: if adding {$p_3$}, SCORE=TP/FP=4; while if adding {$p_4$, $p_1$}, SCORE=TP/FP=3. Hence, the final selected signatures to publish are {$p_3$} and {$p_2$, $p_1$}. For each round, all signatures in $C$ need to be checked against all samples. As a result, the time complexity of this approach is O(MS·|$C$|·(x+y)).

b. Threshold-Based Approach

This approach first sorts all signatures in $C$ based on their own SCORE, and then selects signatures one by one from the sorted list. The sorted signature list for the above example is:
1) {$p_2$, $p_1$}: SCORE=INF;
2) {$p_3$}: SCORE=2;
3) {$p_4$, $p_1$}: SCORE=2.

In order to find the signatures that together give FINAL-LIST a better SCORE, signature refiner 408 only adds in signatures that have higher added quality. In particular, a threshold T is set and a signature is only added in if its added-SCORE ($P_i$) (=added-TP($P_i$)/added-FP($P_i$)) exceeds this threshold. In various embodiments, T is a hyper-parameter that can be set by tuning on a validation dataset. Suppose T=2. With the sorted signature list, {$p_2$, $p_1$} is first added; {$p_3$} is skipped because its added-SCORE=added-TP/added-FP=1 is below T=2; finally, {$p_4$, $p_1$} is added because its added-SCORE=2. The time complexity is (|$C$|·(log|$C$|+(x+y))), only $$\frac{1}{MS}$$

of the first approach.

D. Example Process

Figure 6:
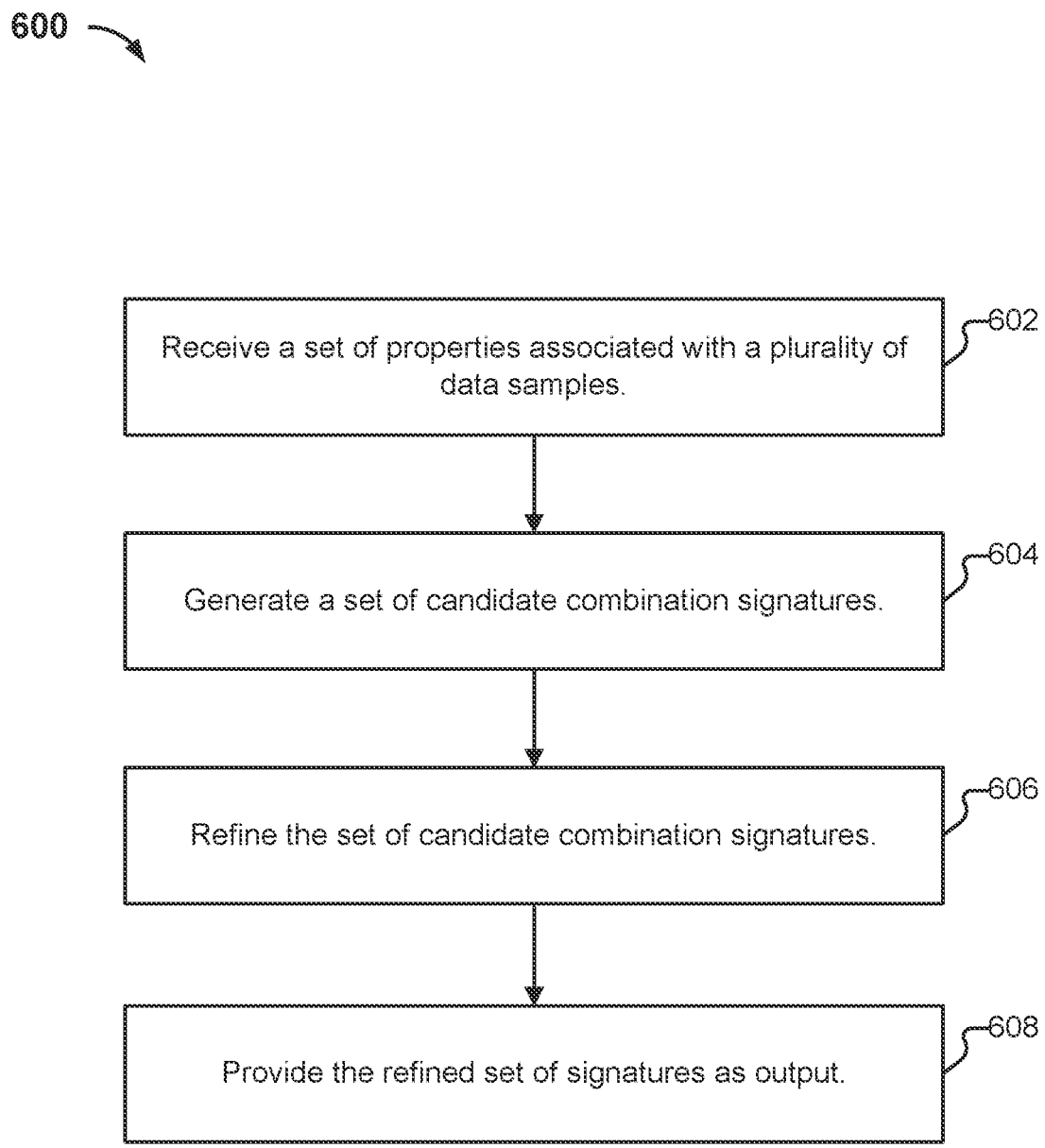
FIG. 6 illustrates an embodiment of a process for automatically generating combination rules.

FIG. 6 illustrates an embodiment of a process for automatically generating combination rules. In various embodiments, process 600 is performed by platform 122, and in particular by automated combination rule generation system 400. Process 600 begins at 602 when a set of properties associated with a plurality of data samples is received. As previously mentioned, FIG. 5 depicts an example of a dataset that can be used in conjunction with the techniques described herein. One way that automated combination rule generation system 400 can receive data (such as dataset 502) at 602 is to perform a query (e.g., of data stored in database 146, database 316, or another appropriate location) for samples (whether benign, malicious, both, etc.). At 604, a set of candidate combination signatures is generated. As explained above, in various embodiments, candidate signature creator 406 uses techniques such as property sorting and best-first enumeration to efficiently generate candidate signatures. At 606, the set of candidate combination signatures is refined. As explained above, in various embodiments, signature refiner 408 can use a variety of approaches (e.g., based on a trade-off preference between time complexity and detection quality) in determining which signatures should be provided as output by automated combination rule generation system 400 as signatures. Finally, at 608 the refined set of signatures is provided as output. As one example, the refined set of signatures can be stored (e.g., in storage 142, database 146, or another appropriate location) by security platform 122 for various uses. One example use is for security platform 122 to include such signatures along with other signatures that it provides to data appliances such as data appliances 102, 136, and 148. Such appliances can then use the provided signatures to help prevent malware from compromising nodes such as client 104 or otherwise causing harm to their respective networks 140, 114, and 116. The signature generation techniques described herein can be used for purposes other than malware detection. As one example, the techniques can be used to find property combinations from samples belonging to the same malware family for better understanding of the family. Another use case is false positive reduction. Existing malware detection techniques may cause many false positives. By generating signatures to only match benign files, such signatures can be used to designate samples as "trusted signed." That is, any files matching benign signatures are treated as benign, regardless of other detection results.

E. Example Optimizations

Various optional optimizations can be used in conjunction with techniques described above. As described above, candidate signature creator 406 adds in a new property and enumerates its combinations with all previously added and non-pruned properties. For instance, in iteration 4, property $p_4$ is added, and combined with all preceding properties [$p_3$, $p_1$, $p_2$]. The enumeration procedure for this iteration can be divided further:

Step 1: add new property $p_4$ and validate $\{p_4\}$;
Step 2: validate $\{p_4, p_3\}$, $\{p_4, p_1\}$, $\{p_4, p_2\}$ if not pruned, and add it to prune set if necessary;
Step 3: validate $\{p_4, p_3, p_1\}$, $\{p_4, p_3, p_2\}$, $\{p_4, p_1, p_2\}$ if not pruned, and add it to prune set if necessary;
Step 4: validate $\{p_4, p_3, p_1, p_2\}$ if not pruned, and add it to prune set if necessary.

As mentioned above, the time complexity of a naïve approach is up to $2^n \cdot (x+y)$. The approach can be sped up through paralleling $2^n$ and reducing $(x+y)$.

1. Multi-Processing

Noticeably, within each above step, the validation of each candidate is completely independent and can be easily parallelized, with results being synchronized and applicable combinations added to the pruned set at the end of each step.

2. Store Parent Combination Hits

For the function ISsignature as described above, an assumption can be made that the input property combination needs to be checked against all samples. In fact, the number of samples to check could be significantly reduced. For each step except the first, the candidates to validate can be expanded from one step above. For instance, candidates $\{p_4, p_3, p_1\}$ and $\{p_4, p_3, p_2\}$ are expanded from $\{p_4, p_3\}$, and $\{p_4, p_3, p_1, p_2\}$ is expanded from $\{p_4, p_3, p_1\}$. If candidate B is expanded from candidate A, A can be denoted as the "parent-combo" of B, and B is the "children-combo" of A accordingly, e.g., A=$\{p_4, p_3\}$ and B=$\{p_4, p_3, p_1\}$. A children-combo can only hit a subset of samples of its parent-combo. Therefore, one optimization is to store the hit sample identifiers of each combination to be expanded, and pass those to its children-combos, in replacement of the whole dataset to check for ISsubset.

3. Pre-Store Samples Per Property

If system memory permits, an additional data structure for the input dataset can be stored during pre-processing: for each property $p_i$, store all malicious and benign sample-identifiers that contain this property. For example, for dataset 502, the following can be stored $\{p_1: \{m: \{m_1, m_3, m_4\}, b: \{b_3, b_4\}\}, \ldots p_3: \{m: \{m_2, m_3\}, b: \{b_4\}\}, \ldots \}$. For ISsignature($P_i$), the intersection of the corresponding sample sets can be determined for all properties in $P_i$, and a check of whether the resulting malicious set is bigger than MinTP can be performed, with the benign set smaller than MaxFP. For example, for $\{p_1, p_3\}$, it can be determined that $\{m_1, m_3, m_4\} \cap \{m_2, m_3\}$ is smaller than MinTP=2, and thus not a signature. With this optimization, there is no need to go through all samples and check ISsubset each time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of properties associated, collectively, with a plurality of data samples, wherein a first data sample has a first subset of properties and wherein a second data sample has a second subset of properties; and
automatically generate a combination signature comprising at least a first property included in the first subset of properties and a second property included in the second subset of properties, including by:
(1) sorting the received set of properties into a sorted list of properties, using a malware frequency-inverse benign frequency score determined for each property included in the set of properties, wherein the score indicates an ability to separate malware from benign samples; and
(2) using an iteration schedule in which, for each iteration, one property is selected from the sorted list and all new combinations are enumerated; and
a memory coupled to the processor and configured to provide the processor with instructions.

2. The system of claim 1, wherein the plurality of data samples includes at least one benign sample and at least one malicious sample.

3. The system of claim 1, wherein the combination signature is usable by a data appliance to determine whether a file is malicious.

4. The system of claim 1, wherein at least some of the properties included in the received set of properties are obtained in response to a static analysis.

5. The system of claim 1, wherein at least some of the properties included in the received set of properties are obtained in response to a dynamic analysis.

6. The system of claim 1, wherein the processor is further configured to pre-process the received set of properties, at least in part by determining which properties in the received set are distinct and mapping the distinct properties to a distinct index.

7. The system of claim 1, wherein the processor is further configured to generate an integerized representation of at least one data sample included in the plurality of data samples.

8. The system of claim 1, wherein automatically generating the combination signature includes generating a set of candidate combination signatures.

9. The system of claim 1, wherein the processor is further configured to maintain a list of pruned combinations and prevent additional processing of any supersets of those pruned combinations.

10. The system of claim 1, wherein automatically generating the combination signature includes refining a set of candidate combination signatures using a best-remaining approach.

11. The system of claim 1, wherein automatically generating the combination signature includes refining a set of candidate combination signatures using a threshold-based approach.

12. A method, comprising:
receiving a set of properties associated, collectively, with a plurality of data samples, wherein a first data sample has a first subset of properties and wherein a second data sample has a second subset of properties; and
automatically generating a combination signature comprising at least a first property included in the first subset of properties and a second property included in the second subset of properties, including by:
(1) sorting the received set of properties into a sorted list of properties, using a malware frequency-inverse benign frequency score determined for each property included in the set of properties, wherein the score indicates an ability to separate malware from benign samples; and (2) using an iteration schedule in which, for each iteration, one property is selected from the sorted list and all new combinations are enumerated.

13. The method of claim 12, wherein the plurality of data samples includes at least one benign sample and at least one malicious sample.

14. The method of claim 12, wherein the combination signature is usable by a data appliance to determine whether a file is malicious.

15. The method of claim 12, wherein at least some of the properties included in the received set of properties are obtained in response to a static analysis.

16. The method of claim 12, wherein at least some of the properties included in the received set of properties are obtained in response to a dynamic analysis.

17. The method of claim 12, further comprising pre-processing the received set of properties, at least in part by determining which properties in the received set are distinct and mapping the distinct properties to a distinct index.

18. The method of claim 12, further comprising generating an integerized representation of at least one data sample included in the plurality of data samples.

19. The method of claim 12, wherein automatically generating the combination signature includes generating a set of candidate combination signatures.

20. The method of claim 12, further comprising maintaining a list of pruned combinations and preventing additional processing of any supersets of those pruned combinations.

21. The method of claim 12, wherein automatically generating the combination signature includes refining a set of candidate combination signatures using a best-remaining approach.

22. The method of claim 12, wherein automatically generating the combination signature includes refining a set of candidate combination signatures using a threshold-based approach.

23. A computer program product embodied in a non-transitory computer readable medium and comprising computer instructions for:
receiving a set of properties associated, collectively, with a plurality of data samples, wherein a first data sample has a first subset of properties and wherein a second data sample has a second subset of properties; and
automatically generating a combination signature comprising at least a first property included in the first subset of properties and a second property included in the second subset of properties, including by:
(1) sorting the received set of properties into a sorted list of properties, using a malware frequency-inverse benign frequency score determined for each property included in the set of properties, wherein the score indicates an ability to separate malware from benign samples; and
(2) using an iteration schedule in which, for each iteration, one property is selected from the sorted list and all new combinations are enumerated.

\* \* \* \* \*